United States Patent
Hoppe

(10) Patent No.: US 7,309,931 B2
(45) Date of Patent: Dec. 18, 2007

(54) ELECTRIC MOTOR WITH COOLING COIL

(75) Inventor: Thomas Hoppe, Schwabhausen (DE)

(73) Assignee: Siemens Aktiengesellschaft, Munich (DE)

( * ) Notice: Subject to any disclaimer, the term of this patent is extended or adjusted under 35 U.S.C. 154(b) by 375 days.

(21) Appl. No.: 10/480,024

(22) PCT Filed: Jun. 6, 2002

(86) PCT No.: PCT/EP02/06222

§ 371 (c)(1),
(2), (4) Date: Dec. 8, 2003

(87) PCT Pub. No.: WO03/015242

PCT Pub. Date: Feb. 20, 2003

(65) Prior Publication Data
US 2004/0169427 A1 Sep. 2, 2004

(30) Foreign Application Priority Data
Jun. 28, 2001 (DE) .................. 101 31 119

(51) Int. Cl.
H02K 41/02 (2006.01)
H02K 9/00 (2006.01)
H02K 9/19 (2006.01)
(52) U.S. Cl. .................. 310/12; 310/16; 310/54
(58) Field of Classification Search ............ 310/52–64, 310/12, 89
See application file for complete search history.

(56) References Cited

U.S. PATENT DOCUMENTS

| | | | | |
|---|---|---|---|---|
| 3,430,692 A | * | 3/1969 | Karmazin | 165/134.1 |
| 3,636,186 A | * | 1/1972 | Sturley | 264/135 |
| 3,758,799 A | * | 9/1973 | Dochterman et al. | 310/89 |
| 3,877,518 A | * | 4/1975 | Dreksler | 165/150 |
| 4,080,703 A | * | 3/1978 | Beck, Jr. | 165/171 |
| 4,172,496 A | * | 10/1979 | Melnyk | 165/76 |
| 4,213,498 A | * | 7/1980 | Vandenbossche | 165/136 |
| 4,749,921 A | * | 6/1988 | Chitayat | 318/135 |
| 5,725,047 A | * | 3/1998 | Lopez | 165/149 |

(Continued)

FOREIGN PATENT DOCUMENTS

DE  41 07 399  9/1992

(Continued)

OTHER PUBLICATIONS

E.R. Laithwaite, Linear-motor Electric machines, Apr. 1970, Proceedings of the IEEE vol. 58, pp. 531-541.*

Primary Examiner—Burton Mullins
(74) Attorney, Agent, or Firm—Henry M. Feiereisen; Ursula B. Day

(57) ABSTRACT

The invention relates to a motor part of a linear motor, i.e. the primary part or secondary part of an asynchronous or synchronous linear motor. According to the invention, it is proposed to configure a cooling coil (K), which has a meandering flat structure, from pipe sections (10) of a material with high heat conductivity, as well as plastic deflections (12, 13). The deflections are preferably configured as pre-fabricated molded plastic parts, and the motor element is preferably cast with the attached cooling coil. According to the invention, cooling coils can be configured from modules in accordance with the required dimensions, and problems caused by bending the metal parts are avoided.

15 Claims, 1 Drawing Sheet

U.S. PATENT DOCUMENTS

| | | |
|---|---|---|
| 5,751,077 A | 5/1998 | Gonzalez |
| 5,783,877 A | 7/1998 | Chitayat |
| 6,263,963 B1 * | 7/2001 | Tippmann et al. ........... 165/171 |
| 6,300,691 B1 * | 10/2001 | Hwang et al. ................. 310/12 |
| 6,469,407 B2 * | 10/2002 | Welke et al. .................. 310/58 |
| 6,661,124 B1 * | 12/2003 | Seki et al. .................... 310/12 |
| 6,844,651 B1 * | 1/2005 | Swift et al. ................. 310/214 |

FOREIGN PATENT DOCUMENTS

| | | |
|---|---|---|
| DE | 196 04 643 A | 8/1997 |
| DE | 197 15 530 | 10/1997 |
| DE | 197 42 255 | 11/1998 |
| DE | 197 49 108 | 4/1999 |
| DE | 197 57 605 | 6/1999 |
| EP | 0 589 187 A | 3/1994 |
| EP | 0 924 839 A | 6/1999 |

* cited by examiner

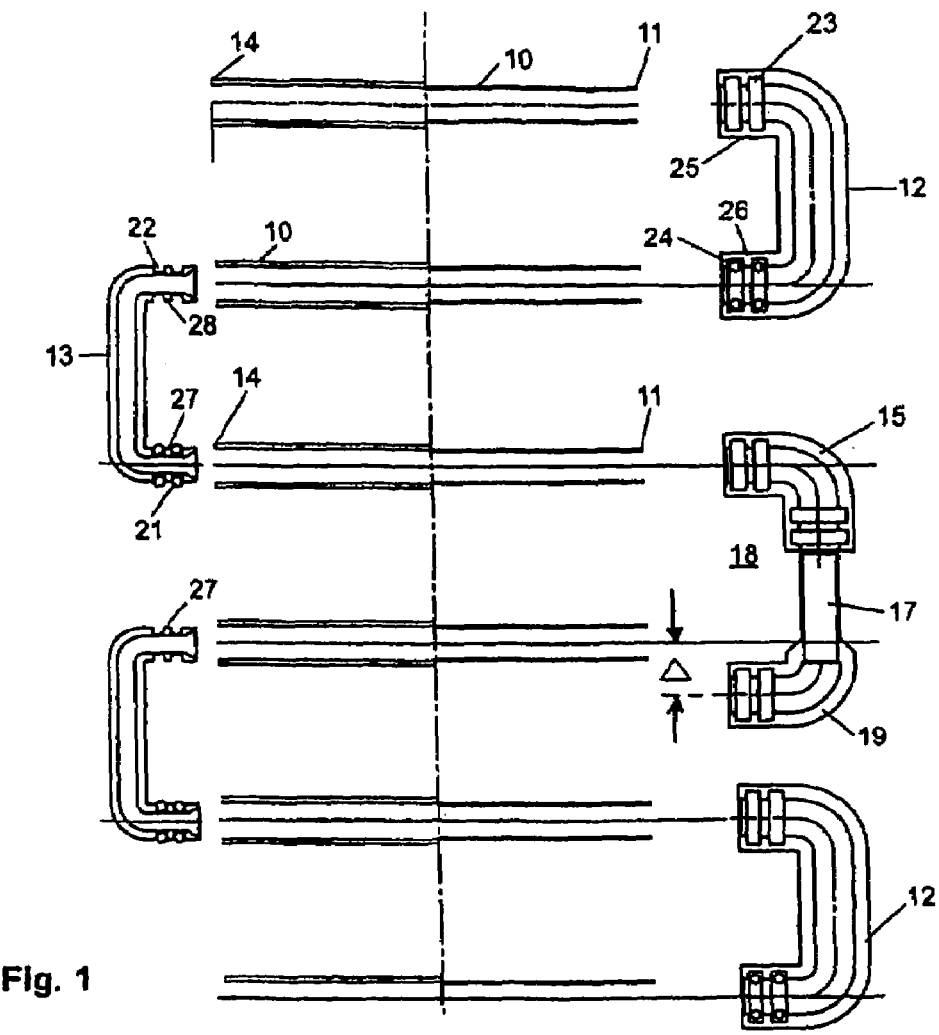
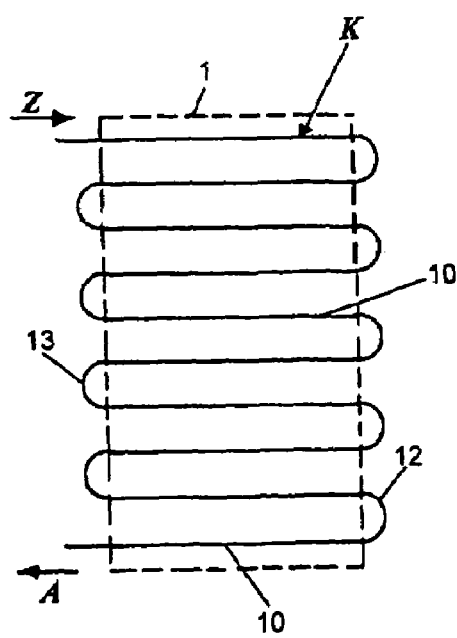
Fig. 1
Fig. 2

ELECTRIC MOTOR WITH COOLING COIL

BACKGROUND OF THE INVENTION

The invention relates to an electric motor with at least one motor part including at least one cooling coil for removal of heat.

In particular in the primary part of a linear motor, which primary part has a body to carry coils, a portion of the supplied electric energy is converted into heat which has to be carried off to the outside. For this purpose, a cooling coil is typically attached to the body on the side distal to the coils for conduction of a cooling medium, such as water.

The cooling coil is made by bending a tube made of a material with high heat conductivity, such as copper, aluminum or the like, in a zigzag or meandering manner to form a flat configuration for securement to the respective surface of the carrier body. The bending process of the material is technologically complex because the bent inner sides may easily upset and/or the bent outer sides may experience cracks. Moreover, it is to be taken into account that various types of linear motors of different dimensions require stocking of different cooling coils, thereby complicating manufacture and increasing stockkeeping.

This problem can also be encountered in conjunction with rotary motors, whereby in this case the cooling coils must be bent in the form of a cylindrical jacket.

SUMMARY OF THE INVENTION

It is therefore the object to provide a motor part for an electric motor with cooling coil, in which the cooling coil is easier to manufacture and can be suited to different dimensions of the motor.

This object is attained by a motor part of an electric motor, in particular primary part, including a body to support components, in particular coils, instrumental for the function of the motor, as well as at least one cooling coil for removal of heat, wherein the cooling coil is secured to the body and has a meandering configuration, characterized in that at least sub-sections of the cooling coil are made of plastic material.

In accordance with the invention, it is proposed to configure at least sub-sections of the cooling coil of plastic material.

The cooling coil is comprised in particular of straight cooling pipes of good heat-conducting material and deflections, whereby the deflections are made of plastic.

Although plastic materials are generally poor heat conductors, the invention is based on the recognition on the other hand that the bends or deflections of meandering cooling coils are normally disposed in peripheral regions of the body that require no or only little heat removal. Accordingly, deflections of plastic material do not or only insignificantly adversely affect the cooling power of the cooling coil as the critical zones that require significant heat removal include cooling pipes of a material with high heat conductivity.

Cooling coils of desired dimensions may be made from modules, for example by sizing cooling pipes to a respective standard length and positioning a suitable number side-by-side in rows according to a desired dimension via the deflections.

According to a simplest variation, the deflections may be made of flexible hoses which are placed over the ends of the cooling pipes or glued thereto. However, long-term sealing or stability problems may be experienced so that this variation appears appropriate only for motor parts in which the cooling coil is later cast with a casting compound.

Therefore, the deflections are preferably made of molded plastic parts, for example of duroplastic materials or thermoplastic materials by means of injection molding or the like.

These deflections have preferably a receiving section for an end of a cooling pipe or a plug-in section for insertion in an end of a cooling pipe. The receiving section or the plug-in section may be provided with sealing elements such as O-rings or the like.

A simple configuration can be realized when, for example, 180° deflections are realized by two 90° elbows. When the deflection is configured as single-piece part, the connection ends for the cooling pipes have a fixed distance. In order to realize a variable distance between the connection ends, the deflections may be comprised of two separate elbows which are interconnected by a coupling section, whereby the coupling portion may be formed on one of the elbows or may be provided as a separate part, in particular as pipe.

BRIEF DESCRIPTION OF THE DRAWING

An exemplified embodiment of the invention will now be described with reference to the attached drawings, in which:

FIG. 1 shows schematically the configuration of a cooling coil of cooling pipes and deflections; and FIG. 2 shows schematically the configuration of a motor part with cooling coil.

DETAILED DESCRIPTION OF PREFERRED EMBODIMENTS

Shown by broken line in FIG. 2 by way of a top view is the body 1 of a motor part of a linear motor. This is, for example, the primary part which is provided on one side of the body 1 with teeth and coils where heat develops. On the other hand, this may also be the carrier plate of a secondary part for supporting the permanent magnets (synchronous motor) or the secondary part of an asynchronous motor in which eddy current are generated.

Attached to the side of the body 1, which side is distal to the electrically effective components (coils, permanent magnets, induction elements) is a cooling coil K made of pipe material and comprised of straight portions 10 and deflections 12, 13 to form a flat, meandering element. Coolant is supplied via an inlet Z, flows through the cooling coil K to thereby absorb heat from the body 1, and exits the cooling coil at outlet A. Although not shown in FIG. 2, the outlet A is typically guided via a conduit to the area of the inlet Z.

As can be seen from FIG. 1, the cooling coil is comprised in accordance with the present invention of several straight pipe portions 10 which are connected with one another via deflections, whereby this Figure depicts three types of deflections 12, 13, 18.

Deflection 12 includes a first 90° elbow with a first receiving section 25, followed by a straight sub-section, and a second 90° elbow-with a second receiving section 26. The receiving sections include, for example, annular grooves 23 for receiving O-rings 24.

The cooling coil is assembled by cutting standard pipes to respective lengths to provide cooling pipes 10 having ends 11 which are inserted in the receiving sections 25, 26 and are thus connected with one another. Accordingly, the inner diameter of the deflection 12 is suited to the outer diameter of the cooling pipe 10.

The deflection, labeled 13 in FIG. 2, is provided, instead with two receiving sections, with two plug-in sections 27, 28 which are each provided with annular grooves 22 and which have an outer diameter corresponding to the inner diameter of the cooling pipe 10. Placed in the annular grooves 22 are also O-rings to ensure a snug fit seal when plugged together.

The deflection, labeled 18 in FIG. 2, includes a first elbow 15 with two receiving sections, and a second elbow 19. The second elbow 19 has a receiving section as well as a coupling section 17 in the form of a pipe for engagement in a receiving section of the elbow 15.

Through suitable selection of the length of the coupling section 17, variable distances between the cooling pipes 10 can be realized, as illustrated in FIG. 2 by the distance Δ.

The illustration of deflections in FIG. 2 is not exhaustive. For example, deflections may be conceivable which, on the one hand, include a plug-in section, and, on the other hand, a receiving section. Furthermore, analogous to the deflection 18, there may be configured a deflection with one or two plug-in sections at the ends. Furthermore, it is not necessary to connect the coupling section 17 in one piece with an element 19. It is also conceivable to configure two elbows 15 with a separate pipe element to form a deflection corresponding to the deflection 18.

Furthermore, it is possible, to modify the cooling pipes, for example, in such a manner that the end 14 is widened for receiving a plug-in section in the form of a sleeve, or to respectively constrict the end 11 for insertion in a receiving section.

The deflections are preferably made as molded plastic parts that are not difficult to connect to metal parts. Unlike the connection of same or different materials by means of welding, brazing etc. no oxidation problems are here encountered.

In order to enhance the adhesion of the deflections to the cooling pipes and to improve the seal, the deflections may be glued to the cooling pipes; optionally the use of O-rings for sealing may hereby be omitted altogether.

After manufacturing in accordance with the invention the cooling coil K of cooling pipes and deflections and attaching it to the carrier body 1, the carrier body is cast with the cooling coil K in a manner known per se with a casting compound, thereby ultimately realizing a securement of the cooling coil K to the body 1, whereby the deflections are protected by the casting compound from external interferences, and the tightness of the cooling coil can be permanently assured.

What is claimed is:

1. A motor part of an electric linear motor, in particular primary part, comprising:
   a body for supporting a heat-generating component; and
   a cooling coil, having a meandering configuration and secured to the body, for removal of heat, wherein the cooling coil includes separate straight cooling pipes, and at least one separate deflection for attachment to and interconnection of the straight cooling pipes, said deflection including two separate elbows made of plastic, wherein the cooling coil and the body are potted in a casting compound.

2. The motor part of claim 1, wherein the deflection is constructed to have a receiving section for accommodation of one end of one of the cooling pipes.

3. The motor part of claim 1, wherein the deflection has at least one plug-in section for insertion in one end of one of the cooling pipes.

4. The motor part of claim 1, wherein the deflection includes a coupling section for connecting the elbows to one another.

5. The motor part of claim 4, wherein one of the elbows is made in one piece with the coupling section.

6. The motor part of claim 4, wherein the coupling section is configured as a pipe.

7. The motor part of claim 1, wherein the deflection is a molded plastic part.

8. The motor part of claim 1, wherein the deflection is an injection molded part of duroplastic material or thermoplastic material.

9. A cooling coil for removal of heat from a heat-generating component of an electric linear motor, comprising a flat structure having a meandering configuration for securement to the heat-generating component, said flat structure including separate straight cooling pipes, and a separate deflection for attachment to and interconnection of the straight cooling pipes, said deflection including two separate elbows made of plastic, wherein each of the elbows has one end configured in the form of an attachment section for connection to a confronting end of the cooling pipes, wherein the attachment section has an anchoring groove for placement of an annular sealing ring.

10. The cooling coil of claim 9, wherein the attachment section has an inner diameter substantially corresponding to an outer diameter of the cooling pipes.

11. The cooling coil of claim 9, wherein the attachment section has an outer diameter substantially corresponding to an inner diameter of the cooling pipes.

12. The cooling coil of claim 9, wherein the deflection includes a coupling section for connecting the elbows to one another.

13. The cooling coil of claim 12, wherein one of the elbows is made in one piece with the coupling section.

14. An electric linear motor, comprising a heat-generating motor part, and a cooling coil, having a meandering configuration and secured to the motor part, for removal of heat, wherein the cooling coil includes separate straight cooling pipes, and a separate deflection for attachment to and interconnection of the straight cooling pipes, said deflection including two separate elbows made of plastic, wherein the deflection includes a coupling section for connecting the elbows to one another, with one of the elbows made in one piece with the coupling section.

15. The linear motor of claim 14, wherein the heat-generating motor part is a member selected from the group consisting of primary part, secondary part, coil, permanent magnet, and induction element, of the electric motor.

* * * * *